W. E. WINES.
PAPER FEEDING DEVICE.
APPLICATION FILED NOV. 13, 1906.

999,936.

Patented Aug. 8, 1911.
7 SHEETS—SHEET 1.

Fig 1.

WITNESSES

INVENTOR
WALTER E. WINES
BY Paul & Paul
HIS ATTORNEYS

W. E. WINES.
PAPER FEEDING DEVICE.
APPLICATION FILED NOV. 13, 1906.

999,936.

Patented Aug. 8, 1911.
7 SHEETS—SHEET 3.

WITNESSES
A. M. Walstrom
J. B. Era

INVENTOR
WALTER E. WINES
BY Paul & Paul
HIS ATTORNEYS

W. E. WINES.
PAPER FEEDING DEVICE.
APPLICATION FILED NOV. 13, 1906.

999,936.

Patented Aug. 8, 1911.
7 SHEETS—SHEET 4.

Fig 4.

WITNESSES
A. M. Walstrom
J. B. Era.

INVENTOR
WALTER E. WINES
BY Paul & Paul
HIS ATTORNEYS

Fig 4.ᵃ

W. E. WINES.
PAPER FEEDING DEVICE.
APPLICATION FILED NOV. 13, 1906.

999,936.

Patented Aug. 8, 1911.
7 SHEETS—SHEET 6.

WITNESSES
O. M. Walstrom
J. B. Era.

INVENTOR
WALTER E. WINES
BY Paul & Paul
HIS ATTORNEYS

W. E. WINES.
PAPER FEEDING DEVICE.
APPLICATION FILED NOV. 13, 1906.

999,936.

Patented Aug. 8, 1911.
7 SHEETS—SHEET 7.

WITNESSES
O. M. Walstrom
J. B. Eva

INVENTOR
WALTER E. WINES
BY Paul & Paul
HIS ATTORNEYS

UNITED STATES PATENT OFFICE.

WALTER E. WINES, OF MINNEAPOLIS, MINNESOTA.

PAPER-FEEDING DEVICE.

999,936.	Specification of Letters Patent.	Patented Aug. 8, 1911.

Application filed November 13, 1906. Serial No. 343,250.

*To all whom it may concern:*

Be it known that I, WALTER E. WINES, of Minneapolis, Hennepin county, Minnesota, have invented certain new and useful Improvements in Paper-Feeding Devices, of which the following is a specification..

The object of my invention is to improve the feeding apparatus shown and described in a certain pending application for Letters Patent of the United States, filed May 2, 1905, No. 258,495, for a newspaper assembling machine.

A further object is to provide a feeding apparatus which will not only effect a very rapid feed or delivery of the paper from the hopper or other receptacle but will also be very positive in its action.

The invention consists generally in a suction device arranged to draw down the forward edge of the paper and feed it forward.

Further the invention consists in means for supporting the forward or inner edge of the pile of papers during the operation of feeding or withdrawing the bottom paper.

Further, the invention consists in various constructions and combinations, all as hereinafter described and particularly pointed out in the claims.

In the accompanying drawings, forming part of this specification, Fig. 4ª is a similar view of a modified construction illustrating the forward edge of the paper drawn down below the level of the bottom of the hopper.

In the drawing, 2 represents a portion of the frame of the machine with which the feeder is used and 3 a shelf or bracket attached to said frame and wherein the feeding mechanism is mounted. This feeding device is designed for use in connection with the newspaper assembling machine shown and described in my application above referred to, and I have not thought it necessary in this application to illustrate the complete machine, as the part not shown is covered by the separate application and is not essential to a clear understanding of the feeding mechanism.

Figure 6:
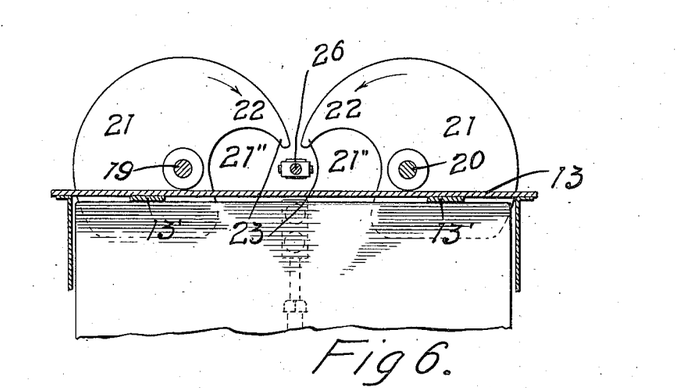
Figs. 6, 7 and 8 are detail views illustrating the different positions assumed by the supporting disks and the paper during the feeding operation.
Figure 7:
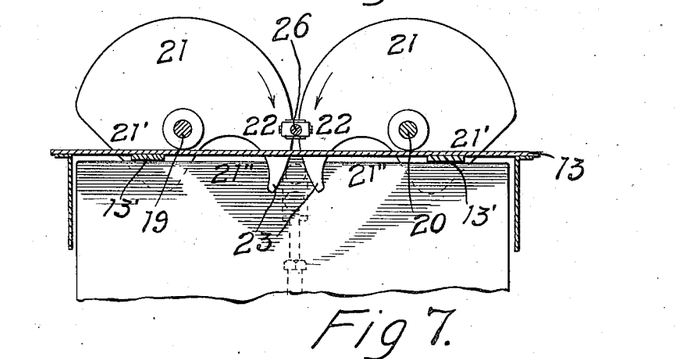
Figure 8:
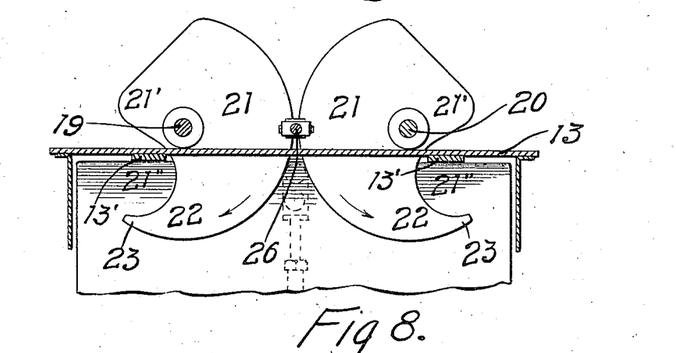

4 is an upright standard horizontally adjustable in the frame 3 by means of slots 5 and adjusting bolts 6. This standard is provided at its lower end with a horizontal plate 7 forming a portion of the floor of the hopper and a plate 8 is arranged to rest on the inner edge of the floor 7, and is adjustably supported at its outer edge upon the standard 4 by means of a slot 9 in said standard and a clip 10 having a clamping bolt. By adjusting the plate 8 vertically its degree of inclination may be increased or decreased as the feeding of the papers may require. On the inner side of the hopper at each end thereof, are upright standards 11 having horizontal slots 12 at the top and bottom wherein an upright plate 13 is horizontally adjustable by means of locking bolts 14. Vertical strips 13' are provided on the plate 13 to contact with the forward edges of the papers and these strips have smooth surfaces past which the papers slide easily. By adjusting the plate 13 and the standard 4 back and forth on their supports I am able to increase or decrease the width of the hopper to accommodate newspapers of different sizes. A transverse shaft 15 has bearings 16 in the upper portion of the plate 13 and is provided with bevel gears 17 meshing with similar gears 18 on the upper ends of vertical shafts 19 and 20 which have bearings in the plate 13 and are provided at their lower ends with disks 21 arranged to revolve in opposite directions but in the same horizontal plane, a portion of said disks projecting forward into the hopper and normally forming a support for one side of the pile of newspapers therein, the other side being supported by the inclined shelf above referred to. These disks are preferably made of thin sheet metal and are provided on one side with curved horns 22 terminating in tapering ends 23 which have sufficient spring to enable them to be pressed downwardly to clear the edge of the papers as will hereinafter appear. The disks are also provided with projections 21′ between which and the horns 22 recesses 21″ are formed, the recesses having curved edges and extending for a considerable distance into the disks. When a newspaper is withdrawn its middle portion is pulled down, by the suction device hereinafter described, through the recesses 21″, (see Fig. 6) while the sides of the paper rest upon the projections 21′ until the horns enter the space between the middle portion (see Fig. 7) of the bottom paper and the one above, when the projections 21′ pass out from beneath the sides of the bottom paper and allow its inner edge to drop down upon the feed rolls (see Fig. 8). The horns passing beneath the middle portion of the upper papers will support their forward edges during the operation of withdrawing the bottom paper.

Between the upright shafts 19 and 20 the shaft 15 is provided with a cam 24 adapted to engage a roller 25 on the upper end of a rod 26 which is vertically movable in guides 27 on the plate 13, being adjustable lengthwise by means of a turn buckle 28 and normally held in its raised position by a spring 29. An anti-friction roller 30 is provided at the lower end of said rod in position to bear on the contiguous spring horns and depress them sufficiently to insure their passage beneath the next to the bottom paper of the pile during the operation of removing the bottom one. The shaft 15 and its connections are driven by the sprocket chain 31 from the shaft 32 extending transversely of the machine and forming the driving shaft of this application, being operated itself from a source of power, not shown. An idle shaft 33 is mounted above the shaft 32 and parallel therewith and carries a series of wheels 34 for the tapes 35. A large gear 36 is secured on the shaft 32 and meshes with an idle pinion 37 which in turn meshes with a gear 38 on a feed roll shaft 39. A similar shaft 39ª is provided on the opposite side of the machine in line with the shaft 39 and having a similar gear 38ª. These shafts have bearings in the sides of the machine and in boxes 40 near the middle thereof, a space being provided between the contiguous ends of the shafts and the boxes 40 for the purpose hereinafter described. A series of feed wheels 41 having corrugated faces are mounted on the shafts 39 and 39ª. By placing the pinion 37 between the gears 38 and 36 I am able to drive the feed wheel shafts in the same direction as the driving shaft. Above the feed wheel shafts is a corrugated roll 42 having pinions 43 adapted to engage the gears 38 and 38ª. The ends of the roll 42 extend beyond the said gears and are mounted in boxes 44 carried by rocker arms 45 and yieldingly supported therein by means of pins 46 and springs 47 arranged within sockets or recesses 48 in said arms, the springs allowing the corrugated roller to yield vertically and accommodate itself to the thickness of the paper passing between it and the feed wheels beneath. The rocker arms are pivoted at 49 on each side of the machine and have pins 50 at their lower ends arranged to project outwardly into cam grooves 51 provided in blocks 52 which are secured to shafts 53 on each side of the feeding apparatus, one of said shafts 53 having a gear 54 on one end meshing with a similar gear 55 on the driving shaft 32. The other shaft 53 on the opposite side of the machine is driven through gears 56 and 57 and a transverse shaft 58. The revolution of these shafts 53 will oscillate the rocker arms and swing the roll 42 back and forth above the feed wheels for the purpose of engaging the forward edge or fold of the bottom paper of the pile and drawing it out from beneath the pile after the said edge has been separated from the paper above by the disks and the suction device hereinafter described. The gear 38ª meshes with an idle pinion 59 which engages a gear 60 on a shaft 61 arranged near the feed roll and wheels, and carrying wheels 62 for the tapes 63. The newspaper is delivered by the feed roller and wheels to the tapes and from thence carried to the assembling mechanism as described in my application above referred to.

Figure 1:
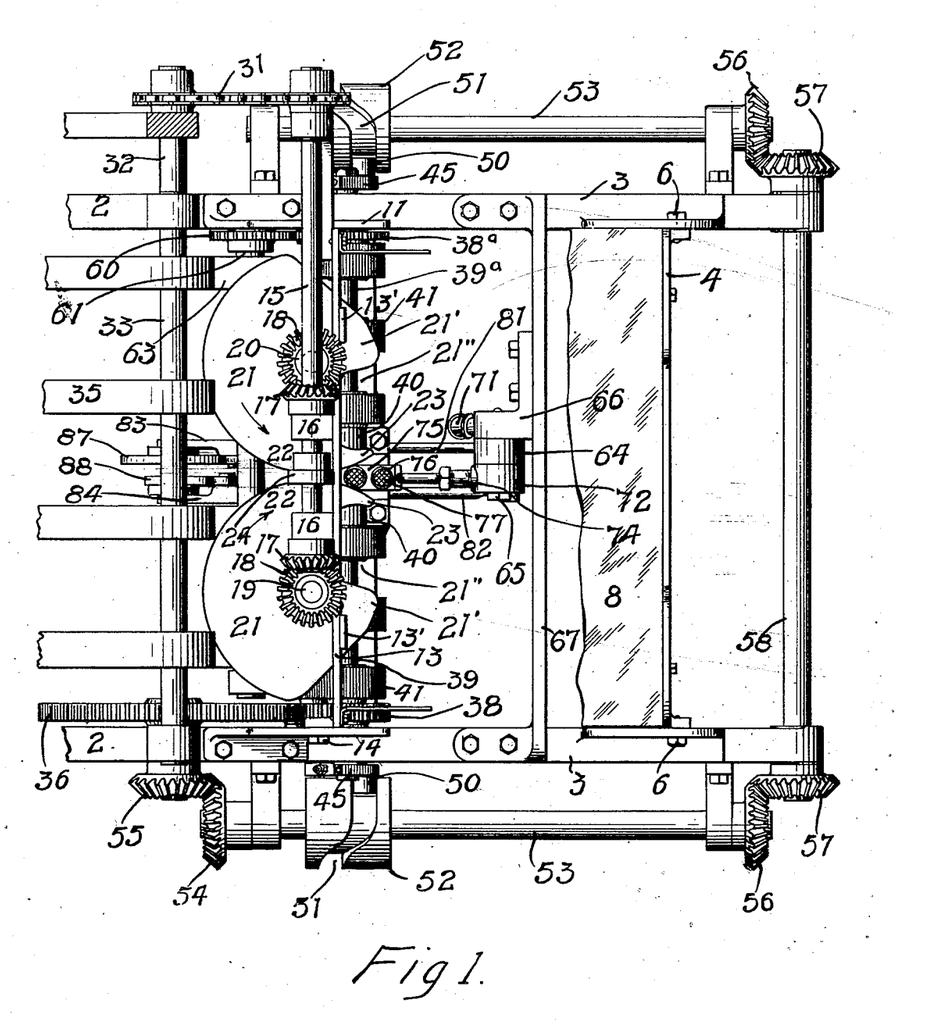
Figure 1 is a plan view of a newspaper feeding apparatus embodying my invention.
Figure 2:
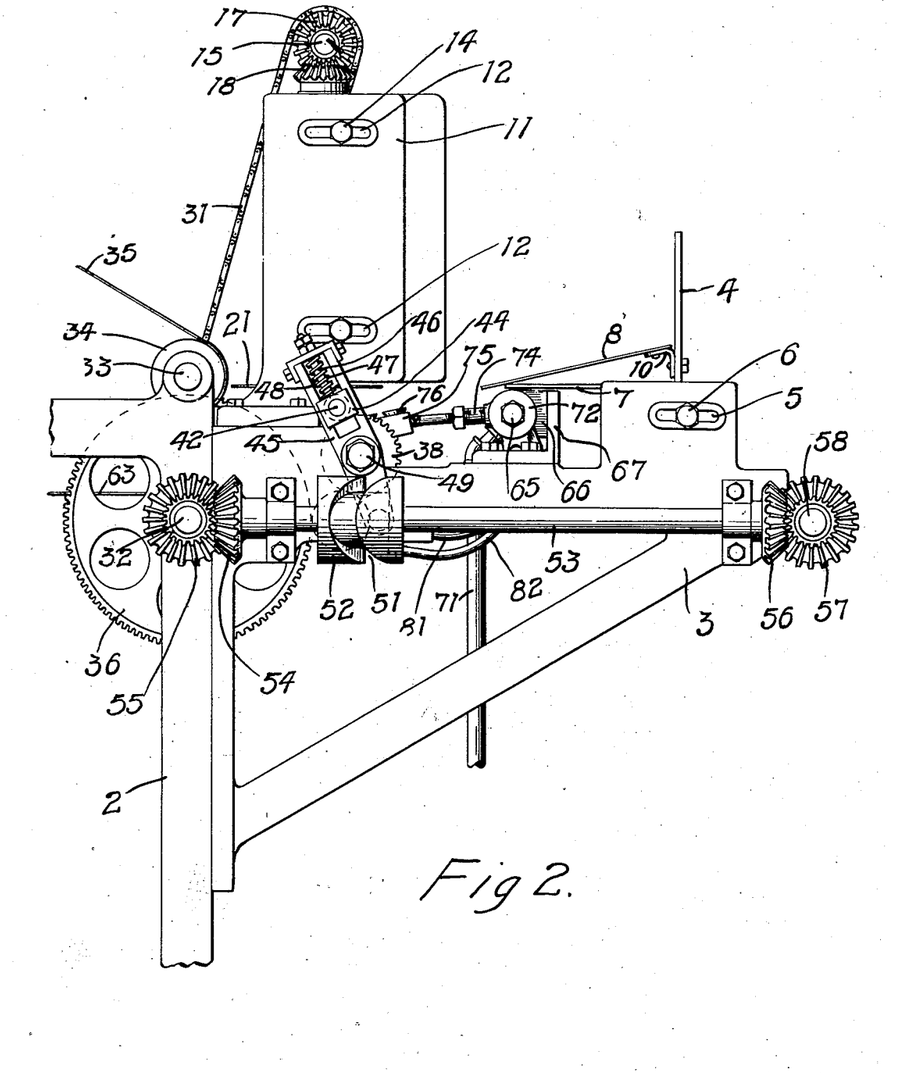
Fig. 2 is a side elevation of the same.
Figure 3:
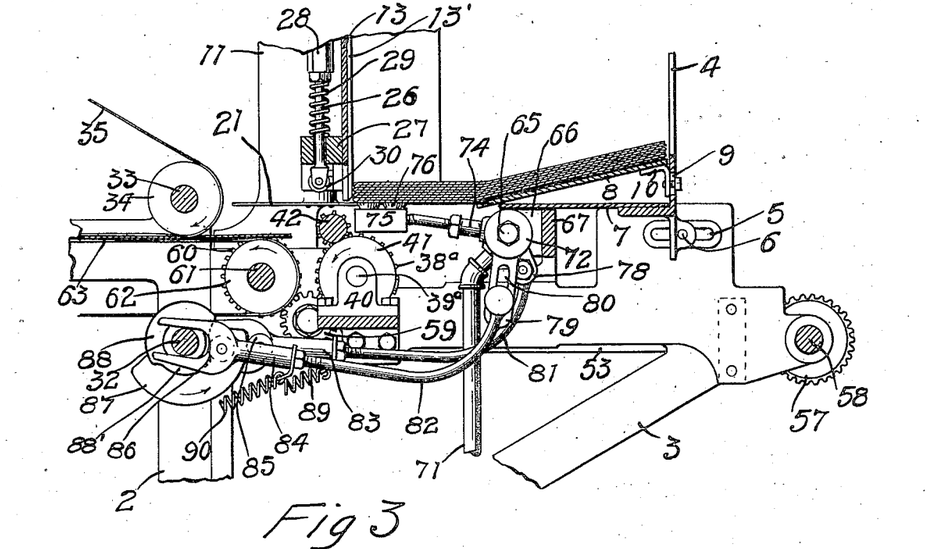
Fig. 3 is a sectional view of the feeding apparatus showing a bundle of papers in place in the hopper.
Figure 4:
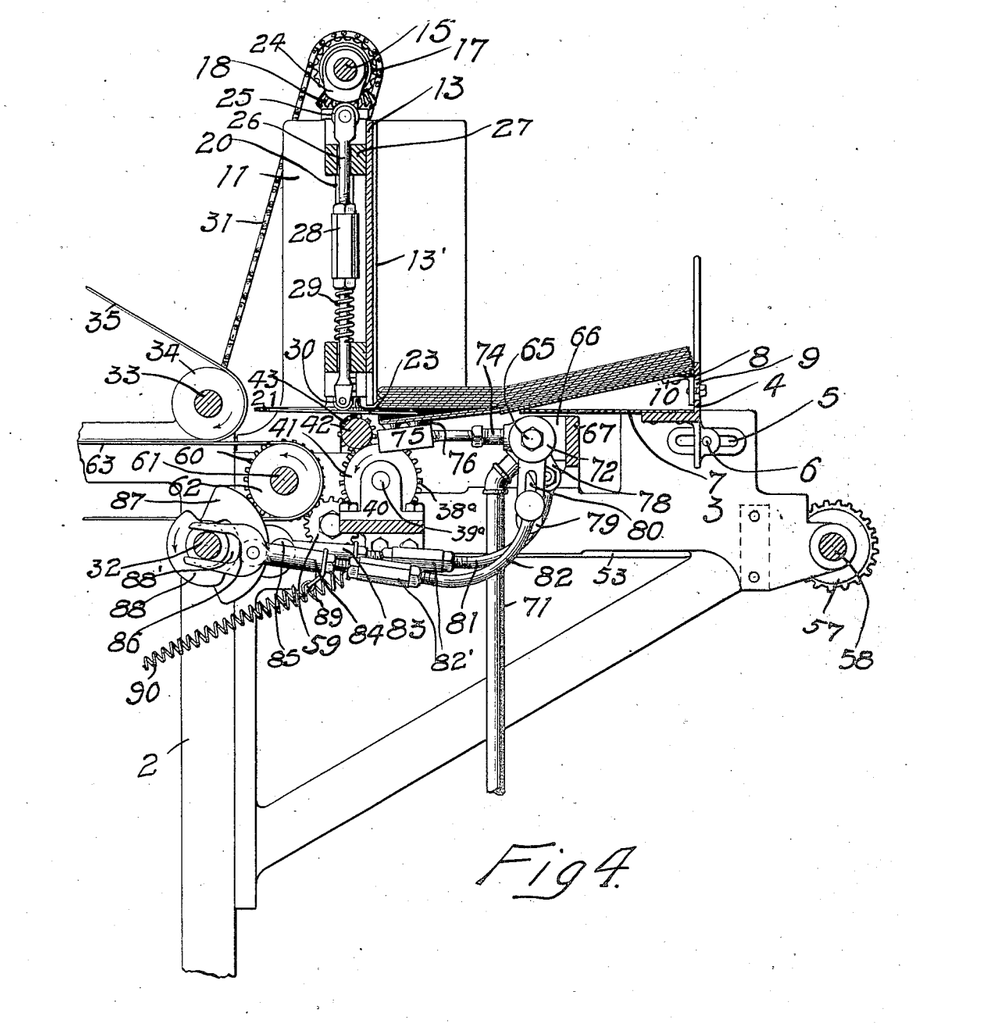
Fig. 4 is a sectional view of the feeding device illustrating the preliminary or initial movement of the suction apparatus.
Figure 5:
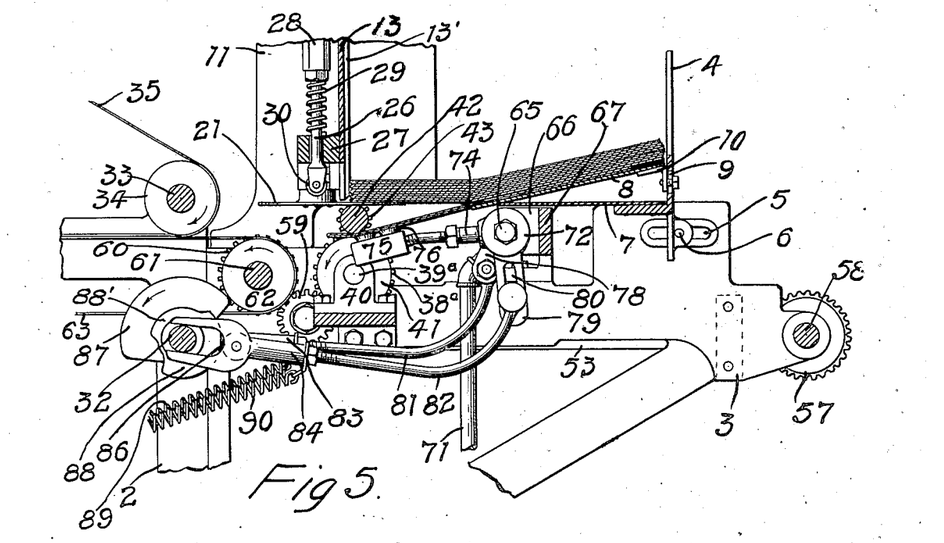
Fig. 5 is a sectional view illustrating the lower paper with its forward edge between the feed rolls, as it is drawn out of the hopper.

In an apparatus of this kind it is desirable to provide some means for separating the forward or inner edge or fold of the bottom paper from those above, preparatory to removing it from the pile. This means must be positive and reliable in its action and to be successful in a commercial sense must be capable of operating at a high speed. The mechanism which I prefer to employ for the purpose consists of an oscillating valve 64 supported by a bolt 65 on a bracket 66 that is secured on a cross bar 67 near the middle of the feeding apparatus. This valve has a chamber 68 arranged to communicate alternately as the valve is oscillated, with an exhaust port 69 and with a passage 70 which leads to a suction pipe 71 connected to a vacuum tank (not shown). A hub 72 is also mounted on the bolt 65 and has a passage 73 communicating with a pipe 74 leading to a block 75 in which cups 76 of suitable material, preferably rubber, are mounted. The mouths of the cups have suitable screens 77 and their edges are adapted to contact with the under side of the bottom paper as indicated in Fig. 3. The valve 64 has a depending arm 78 and an arm 79 preferably longer than the arm 78 is provided on the hub 72. The arm 79 has a slot 80 wherein a rod 82 is adjustably secured and a rod 81 is connected to the arm 78. The rods are curved inwardly toward the center of the machine and have threaded connections with forks 83 and 84 which straddle the driving shaft 32 and rest thereon. Rollers 85 and 86 are mounted on these forks respectively in position to be engaged by cams 87 and 88 secured on the driving shaft. The cam 88 is provided with a surface 88' that is adapted to engage the roller 86 and impart a preliminary downward movement to the suction device (see Fig. 4), which thereafter while the surface 88' is in contact with the roller 86 will be momentarily stationary to allow sufficient time for the horns or points 23 to enter between the edge of the lower paper and the one next above, and also to allow the supporting edges of the disks to be withdrawn from under the bottom paper of the series. The oscillation of the suction device is checked just long enough to allow the disks to assume their proper position and then the high surface of the cam 88 will engage the roller and the suction device will be swung down without interruption to its lowest position. The rollers are held in engagement with their cams and the suction device kept in a raised position by means of springs 89 and 90 connecting the rods 81 and 82 with the frame of the machine. The stroke of the suction device can be regulated by means of the rod 82 and its adjustable connection with the arm 79, or by the turn-buckle 82' (see Fig. 4). The rollers are held in engagement with their cams and the suction device is held in a raised position by means of springs 89 and 90 attached to the rods 81 and 82 and to the frame of the machine.

Figures 9, 10, 11, 12:
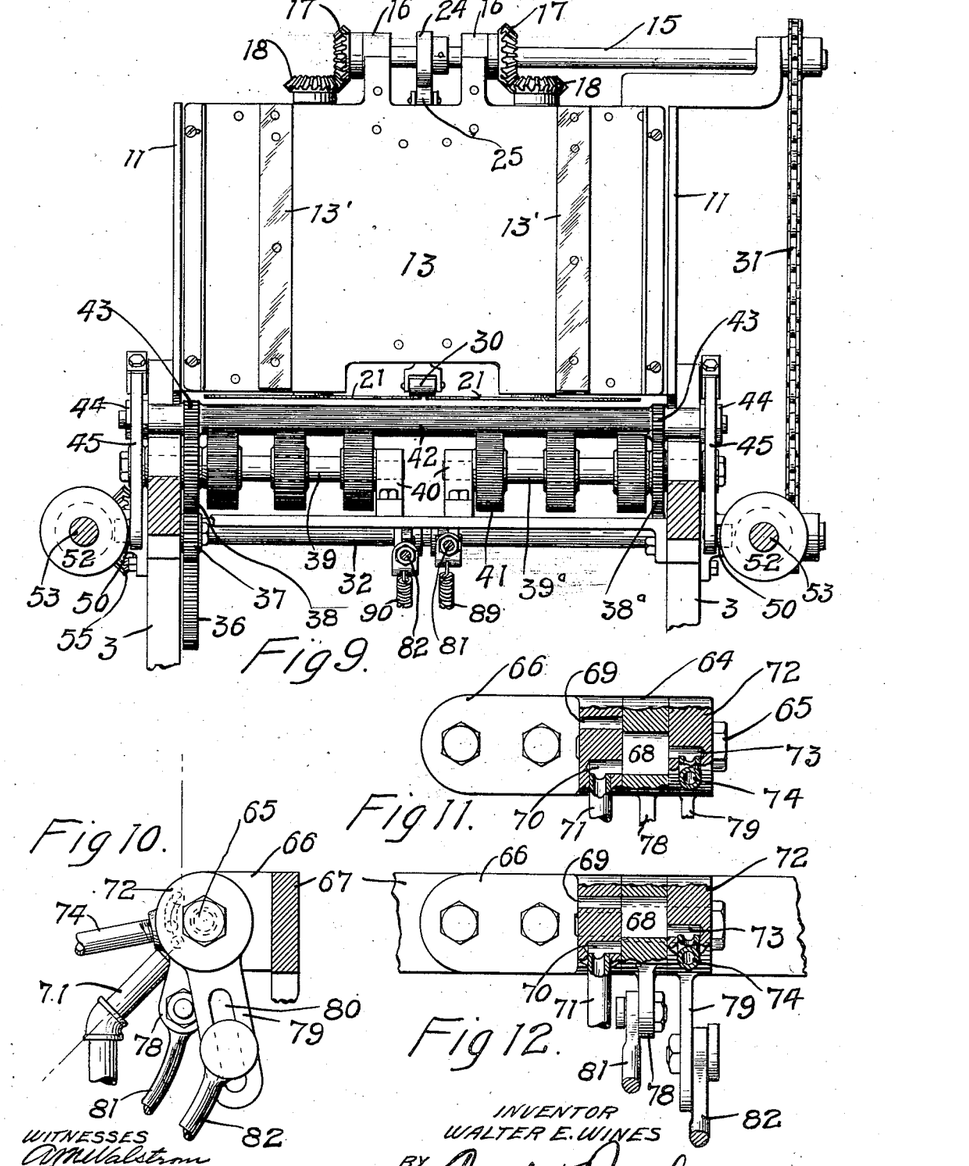
Fig. 9 is a transverse sectional view looking toward the feed rolls and the hopper.
Figs. 10, 11 and 12 are details of the valve devices for controlling the suction feed.

The chamber or space 68 in the valve 64 is of sufficient size so that at one part of its stroke it will register with the passages 70 and 73 (see Fig. 11) and at the other end of its stroke the entrance to the passage 70 will be closed and the chamber will register with the ports 69 and 73 (see Fig. 12). When communication is established between the passages 70 and 73 there will be a strong suction of air through the pipe 74 and the suction cups, and the paper with which the edges of the cups are in contact will be held securely thereby. This sucking action will continue as long as the passage 73 is in communication with the port 70 and the pipe 71. When the cam 87 engages its roller the valve 64 will be oscillated and will continue to move until it assumes the position shown in Fig. 12, when the passage from the vacuum tank to the suction device will be cut off and the suction through the cups destroyed. The movement of the mechanism is timed so that this cut off will take place at the time when the edge of the paper having been drawn down, the corrugated roll is swung outward or backward to grip the paper and pull it out of the hopper.

In Fig. 3 the mechanism is shown in the position in which communication is established through the valve to the suction cups and the paper is gripped by the edges of the cups preliminary to drawing its folded edge downward. The downward movement of the suction device will commence when the cam 88' engages its roller and, as heretofore described, an initial or preliminary movement of the suction device will take place and then it will stop momentarily, starting again and continuing its downward movement when the roller passes from the surface 88' to the higher surface 88.

The operation of the machine is as follows:—The hopper having been adjusted for the size of the folded newspapers and a pile of them placed therein, the machine is set in motion and the suction device will be swung up against the middle portion of the forward edge of the bottom paper and the cups communicating with the vacuum tank will produce sufficient suction to grip the paper so that when the suction device swings down the middle portion of the paper will be drawn with it. The ends of the paper will rest on the projections 21' as heretofore described, and after its initial movement, the suction device will stop long enough to allow the horns or points 23 to pass between the edge of the lower paper and the one next above and permit the supporting edges of the disks to be withdrawn and allow the entire forward edge of the bottom paper to drop down with the suction device when it begins its final movement. As the suction device reaches the end of its stroke the corrugated feed roll will be swung forward to grip the paper and the instant it begins to draw the paper out of the hopper the connection of the suction device with the vacuum tank will be destroyed and the paper released. The feed roll will then immediately pull the paper out from beneath the others and return to its normal position. The suction device will be swung upward by the tension of its spring, the valve will be opened establishing communication again between the suction device and the vacuum tank and the operation described will be repeated.

I claim as my invention:—

1. The combination, with a hopper adapted to contain a pile of newspapers placed one above another, of a suction device arranged to draw down one edge of the bottom paper preparatory to withdrawing the same, and means comprising disks operating in opposite directions for supporting the corresponding edges of the papers above the bottom during the withdrawal of the bottom one, substantially as described.

2. The combination, with a hopper adapted to contain a pile of newspapers placed one above another, of means for drawing down one edge of the bottom paper, means for supporting the corresponding edges of the papers above comprising disks operating in opposite directions, and means for withdrawing the bottom paper from beneath the others, substantially as described.

3. In a feeding apparatus, a suction device comprising a bolt or rod, a hub mounted thereon and having an oscillating movement and provided with a port or passage, a pipe communicating with said passage, suction cups carried by said pipe, a valve having a chamber arranged to communicate with the passage in said hub and with a port leading to the vacuum tank and an exhaust passage, said valve and hub having depending arms, rods attached to said arms for oscillating said hub and valve and mechanism for operating said arms whereby said suction pipe will be placed in communication with said cups or cut off therefrom, substantially as described.

4. The combination, with a hopper adapted to contain a pile of newspapers placed one upon another, of means for feeding the bottom paper of the pile, and means comprising oppositely moving disks arranged to revolve in a horizontal plane for supporting the inner edges of the papers above during the withdrawal of the bottom one.

5. The combination, with a hopper adapted to contain a pile of newspapers placed one upon another, of paper feeding means and oppositely revolving disks arranged to pass beneath the inner edges of the upper papers and support them during the withdrawal of the lower one, substantially as described.

6. The combination, with a hopper adapted to contain a pile of newspapers, placed one above another, of revolving disks of thin material operating in opposite directions and in the same horizontal plane and adapted to support the inner edges of the upper papers of the pile during the withdrawal of the bottom one.

7. The combination, with a hopper adapted to contain a pile of newspapers placed one upon another, of supporting devices for the inner edges of said papers and arranged to revolve in horizontal planes, and means for pressing down the edges of said supporting devices whereby their passage beneath the next to the bottom paper of the pile without mutilating it, is assured.

8. The combination, with a hopper adapted to contain a pile of newspapers placed one upon another, of rotating spring metal disks operating in opposite directions and in the same horizontal plane and adapted to pass beneath and supporting the forward edges of the pile of papers, and means for pressing down the edges of said disks preparatory to their passage beneath the papers, substantially as described.

9. The combination, with a hopper adapted to contain a pile of papers, of sheet metal disks revolving in a horizontal plane and having curved horns arranged to extend beneath the pile of papers and means for engaging and pressing said horns downwardly to insure their passage beneath the papers, substantially as described.

10. The combination, with a hopper adapted to contain a pile of newspapers, of revolving supporting devices arranged to pass beneath the papers, said supporting devices being composed of spring material, a vertically moving rod arranged to engage said devices and a shaft having a cam to engage said rod and force it downward to engage and depress said supporting devices for the purpose specified.

11. The combination, with a hopper adapted to contain a pile of newspapers, of supporting devices arranged to pass beneath the papers, said supporting devices being composed of spring material and means engaging and springing the edges of said devices downwardly.

12. The combination, with a hopper adapted to contain a pile of newspapers placed one above another, of disks arranged to revolve in a horizontal plane and having projections 21' and horns 22 with a recess 21'' between them, the inner edges of the pile of papers normally resting on the said disks, and means for drawing down the middle portion of the inner edge of the bottom paper through said recesses, the sides of said bottom paper being supported on said projections until in the revolution of said disks said horn enters the space between the drawn down portion of the bottom paper and the pile above, substantially as described.

13. The combination, with a hopper adapted to contain a pile of newspapers placed one above another, of revolving means having a plane surface supporting the forward edges of the pile of papers, means for drawing down the middle portion of the forward edge of the bottom paper, said drawing means stopping momentarily after its initial movement to allow sufficient time for said supporting means to be withdrawn from beneath the bottom paper, substantially as described.

14. The combination, with a hopper adapted to contain a pile of newspapers placed one above another, of means for drawing down the edge of the bottom paper, said drawing means having an initial and a final movement and a stationary period between such movements, means for supporting the forward edges of the papers, means arranged to pass in between the forward edge of the bottom paper and the corresponding edges of the papers above, and said stationary period of said drawing down means allowing sufficient time for the withdrawal of said supporting means and the entrance of the separating means between the bottom paper and the one next above, substantially as described.

15. The combination, with a hopper adapted to contain a pile of newspapers placed one above another, of means for drawing down one edge of the bottom paper, said drawing down means having an initial and a final movement and an intermediate stationary period, revolving disks normally having portions extending under the pile of papers and supporting one edge of the same, said disks also having horns arranged to pass between the one edge of the bottom paper and the corresponding edges of the papers above when said disks are revolved, the stationary period of said drawing means allowing the withdrawal of the supporting portions of said disks and the entrance of said horns between the drawn down portion of the bottom paper and those next above.

16. The combination, with a hopper adapted to contain a pile of newspapers placed one above another, of a suction device arranged to engage one edge of the bottom paper, a cam mechanism arranged to impart an initial and a final movement to said suction device with an intermediate stationary period, and means comprising oppositely revolving disks arranged to pass in between the edge of the bottom paper and the corresponding edges of the papers above to separate them during the stationary period of said suction device.

In witness whereof, I have hereunto set my hand this 8th day of November 1906.

WALTER E. WINES.

Witnesses:
RICHARD PAUL,
J. B. ERA.